United States Patent [19]

Fagerburg et al.

[11] Patent Number: 5,258,489
[45] Date of Patent: Nov. 2, 1993

[54] FLUORINATED POLY(ARYLENE SULFIDE)(ARYLENE DISULFIDE)

[75] Inventors: David R. Fagerburg; Jospeh J. Watkins, both of Kingsport; Paul B. Lawrence, Blountville, all of Tenn.

[73] Assignee: Eastman Chemical Company, Rochester, N.Y.

[21] Appl. No.: 26,666

[22] Filed: Mar. 5, 1993

[51] Int. Cl.$^5$ .............................................. C08G 75/14
[52] U.S. Cl. ...................................... 528/389; 528/86; 528/125; 528/391
[58] Field of Search ................... 528/389, 125, 86, 391

[56] References Cited

U.S. PATENT DOCUMENTS

| | | | |
|---|---|---|---|
| 4,786,713 | 11/1988 | Rule et al. | 528/389 |
| 4,826,956 | 5/1989 | Fagerburg et al. | 528/214 |

FOREIGN PATENT DOCUMENTS

| | | |
|---|---|---|
| 61-225218A | 3/1985 | Japan . |
| 61-231030A | 4/1985 | Japan . |
| 61-293225A | 6/1985 | Japan . |

*Primary Examiner*—Harold D. Anderson
*Attorney, Agent, or Firm*—Charles R. Martin; William P. Heath, Jr.

[57] ABSTRACT

A polymer having repeating units corresponding to the structure

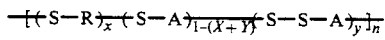

wherein R is selected from the group consisting of

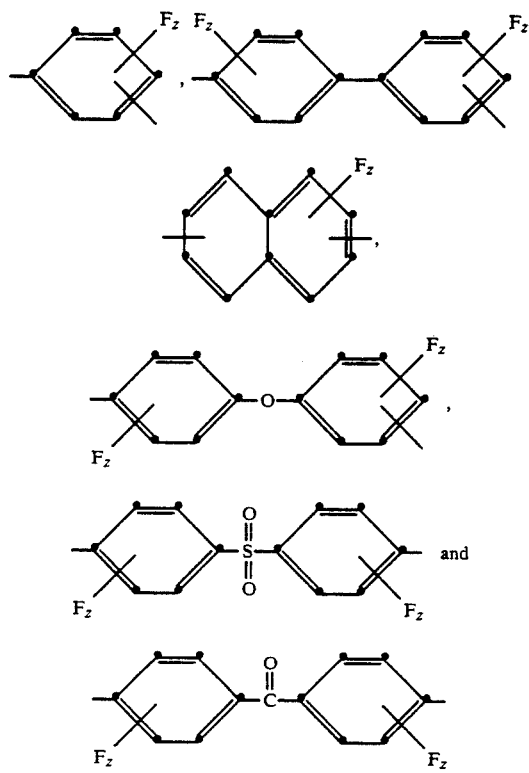

where z is 1, 2, 3, or 4, A is a divalent substituted or unsubstituted aromatic radical, y is in the range of 0.10 to 0 and x is in the range of 0.02 to 0.90 and n is at least 50.

10 Claims, No Drawings

FLUORINATED POLY(ARYLENE SULFIDE)(ARYLENE DISULFIDE)

The invention relates to a fluorinated copoly(arylene sulfide). These polymers exhibit excellent adhesion to metal surfaces.

Copolymers of poly(phenylene sulfide) and other aromatic radicals are known in the art. Japanese Patent J6 1231 030 A discloses copolymers of poly(phenylene sulfide) with 1 to 5 mol % of biphenylene or triphenylene units. Japanese Patent J6 1225-218-A disclosed a copolymer with sulfone groups which is said to be a block copolymer. Japanese Patent J6-1293-225-A discloses poly(phenylene sulfide) containing diphenyl ether units.

Copoly(arylene sulfide) polymers prepared by heating a diiodoaromatic compound in the presence of elemental sulphur are disclosed in U.S. Pat. No. 4,786,713. These polymers can be described as corresponding to the structure

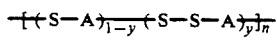

where y is in the range of 0.5 to 0.001.

We have now discovered that this polymer can be modified by use of certain specific aromatic radicals which have been substituted with fluorine atoms to produce a polymer which has excellent adhesion to metals. The fluorinated aromatic radicals are incorporated into the polymer by using diiodo fluorinated aromatic compounds as a comonomer along with the iodoaromatic compound and sulfur.

The polymer of this invention can be described as having repeating units corresponding to the structure

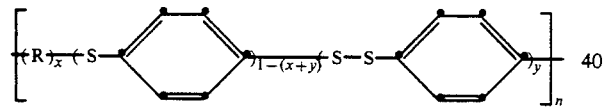

wherein R is selected from the group consisting of

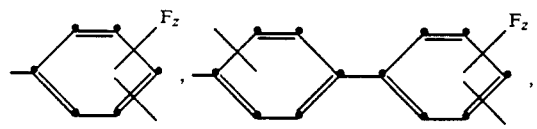

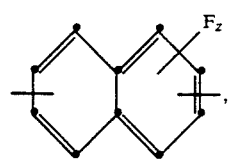

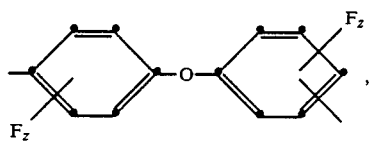

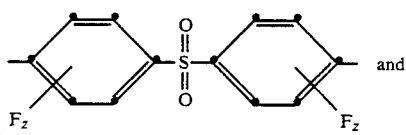
and

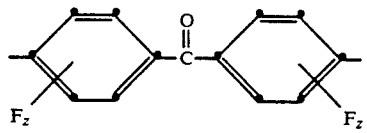

where z is 1, 2, 3, or 4, A is divalent substituted or unsubstituted aromatic radical, y is in the range of 0.10 to 0, preferably 0.08 to 0.001 and more preferably 0.18 to 0.001 and x is in the range of 0.02 to 0.90, preferably 0.05 to 0.85 and more preferably 0.10 to 0.80 and n is at least 50, preferably at least 80.

The fluorinated copoly(arylene sulfide) of this invention is prepared by reacting the diiodo fluorinated compound corresponding to the above structures, the diiodo aromatic compound and sulfur in the same manner as disclosed in U.S. Pat. No. 4,786,713 for the copoly(arylene sulfide) not containing the fluorinated divalent aromatic radicals.

The diiodoaromatic and the fluorinated diiodoaromatic staring materials of the present invention may be prepared by methods well known in the art.

In a preferred embodiment the diiodoaromatic radical is phenylene, biphenylene, diphenyl ether, or naphthalene and is prepared by use of the diiodo forms of these materials. In a most preferred embodiment the aromatic radical is unsubstituted phenylene.

In a preferred embodiment the value of z for the fluorinated diiodoaromatic compound in 4. In a most preferred embodiment, the fluorinated diiodoaromatic compound is 2,3,5,6 tetrafluoro-1,4-diiodobenzene which contributes the radical

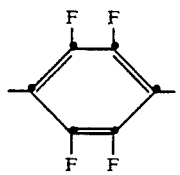

The amount of fluoro containing monomer that can be employed range from 2 to 90 mol % with a preferred range of 5 to 85 mol % and a more preferred range to 10 to 80 mol %.

Thus, in the most preferred embodiment of this invention the fluorinated copoly(arylene sulfide) has repeating units corresponding to the structure

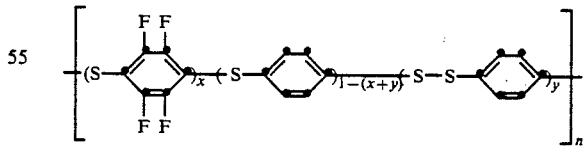

wherein y is in the range of 0.18 to 0.001 and x is in the range of 0.10 to 0.80 and n is at least 80.

The melt viscosity of the copolymers is a minimum of 500 poise and more preferably 1000 poise as measured at 300° C. There is no practical upper limit of the melt viscosity of the copolymers as higher melt viscosities do not render them unsuitable for use. For example, melt viscosities exceeding 100,000 poise at 300° C. can be readily fabricated into films or other shapes.

Sulfur is reacted as elemental sulfur and may consist of any of the standard forms which are possible for elemental sulfur. That is, the sulfur may be present in any of its allotropic modifications such as orthorhombic cyclooctasulfur ($S_8$) or any other cyclic elemental sulfur such as any of the cyclosulfur species having 6-12 sulfur atoms. Additionally, any crystalline form of sulfur may be used in the present reaction. Surprisingly, impurities in the elemental sulfur do not appear to affect the efficiency or selectivity of the present polymerization reaction. The sulfur preferably has a purity of about 98%-100%, although sulfur having a lower degree of purity may be used. This lack of sensitivity to the presence of impurities in the sulfur is advantageous to the present process when used as a commercial process since highly purified sulfur is not required and the associated expense is not incurred.

In the process used to prepare the polymer of this invention sulfur reacts with both the diiodo fluorinated aromatic compound and the diiodoaromatic compound eliminating elemental iodine and forming the polymer.

The formation of polymer is not sensitive to the relative stoichiometry of the diiodoaromatic compounds and sulfur. Accordingly, an excess of sulfur or an excess of diiodoaromatic compounds may be used in the polymerization process. When excess sulfur is used, some disulfide linkages are observed in the polymer. Decreasing amounts of sulfur result in decreasing levels of disulfide linkages in the final polymer. When the diiodoaromatic compounds are present in excess, polymerization to high polymer can still occur, if the excess diiodoaromatic compounds are removed during final polymerization.

The polymerization reaction is preferably carried out in the absence of solvent by merely heating and reacting the sulfur, diiodo fluorinated aromatic compound and the diiodoaromatic compounds. Under these conditions, the diiodo fluorinated aromatic compound and the diiodoaromatic compound acts as a solvent for the sulfur which is melted thereby forming a substantially homogeneous solution enabling a facile and complete reaction.

In another embodiment, the diiodo fluorinated aromatic compound and the diiodoaromatic compound can be dissolved in an organic solvent which is inert to the reaction with iodine and sulfur. High boiling inert aromatic solvents are preferred such as, for example, aromatic hydrocarbons, diarylsulfides, diarylethers and diarylsulfones. It is preferable to use a solvent which corresponds to the diiodoaromatic compound which is being polymerized. Thus, for example, in a polymerization using diiodobenzene as the diiodoaromatic compound, one might use benzene, naphthalene or diphenyl sulfide as a solvent.

During the polymerization reaction between the diiodo fluorinated aromatic compound, the diiodoaromatic compound diiodobenzene and sulfur elemental iodine is produced and evolves from the reaction melt or solution. Removal of the elemental iodine is not necessary to cause completion of the polymerization reaction but is highly desirable to enable recycling in the overall process. The iodine may be removed by passing a stream of air or an inert gas such as nitrogen or argon over or through the reaction mass at atmospheric or superatmospheric pressure or alternatively by applying a vacuum to the reaction apparatus. The elemental iodine may be collected and used as a commercial product or as a reactant for further chemical processes.

The polymerization reaction is generally conducted at a temperature above about 175° C. Although the reaction may be conducted at temperatures below 175° C., the polymerization reaction is much slower. There is no particular upper temperature limit on the polymerization reaction, which may be conducted at any temperature below the decomposition temperature of the diiodoaromatic compound. For most polymerization reactions, temperatures in the range of about 175°-400° C. will be suitable, although for particular diiodoaromatic compounds temperatures in excess of 400° C. may be used. Particularly preferred temperature ranges are from about 180° to about 350° C. while the most preferred temperature range is from about 220° to about 350° C.

The reaction is generally conducted for a period of at least one-half hour and is continued for up to about 10 hours or longer, and reaction times approaching infinity are theoretically possible. The exact reaction time will depend on the diiodoaromatic compound, the engineering requirements of the process, and the specific molecular weight, viscosity and physical properties of the desired product.

The polymerization reaction may be carried out in a batch reaction vessel or may be carried out as a semicontinuous or continuous process. Agitation of the reaction mixture is optional, however, agitation or stirring assists in the production and yield of the polymeric product. Agitation of the reaction mixture may be accomplished by any known method, such as mechanical stirring or by passing a stream of gas through the reaction mixture.

In a preferred embodiment, the polymerization reaction is conducted on a continuous basis with the diiodo fluorinated aromatic compound, the diiodoaromatic compound and sulfur being combined in a continuous staged reactor to form a reaction melt. An inert gas such as nitrogen or argon is passed through the melt, preferably in a countercurrent direction, thereby aiding in agitation and mixing of the reaction melt and at the same time removing the elemental iodine which is evolved and sweeping it out of the reactor. An oxygen-containing gas may be used as disclosed in U.S. Pat. No. 4,826,956. Alternatively, a vacuum may be applied to the reactor to remove the elemental iodine as it is generated. A sweep of an oxygen-containing gas may also be used as disclosed in U.S. Pat. No. 4,826,956. It should be noted that the reaction proceeds equally well under batch conditions and combinations of batch and continuous processes are considered to be well within the scope of the present invention.

The polymer of this invention is useful for preparation of various shaped articles such as pellets, fibers and molded articles. The polymer can be prepared into these shaped articles by conventional processes, such as injection molding, melt spinning, and melt extrusion.

EXAMPLES

Example 1

This examples illustrates preparation of a polymer in accordance with this invention.

Into a 500-mL, 3-neck, round bottom flask are weighed the following: 33 g sulfur (1.029 mol), 327.9 g p-diiodobenzene (0.994 mol), 85.2g 2,3,4,5-tetrafluoro-1,4-diiodobenzene (0.212 mol, 21 mol percent), and 0.8 g of 2,4-diiodo-1-nitrobenzene to act as a catalyst. The flask was fitted with a 350 mm long Vigreux column, a mechanical stirrer through the center joint, and an inlet tube for a slow air sweep. The column was attached via a distillation head and a takeoff tube to a distillation receiver which was cooled in dry ice. The receiver was connected to a vacuum source. The flask was maintained at 200 torr pressure and immersed in a metal bath controlled at 232° C. The air sweep was held at 0.1 cubic feet per hour. It was held under these conditions for 2.5 hr, at which time the bath temperature was raised to 242° C. After 1.5 hr, the pressure was reduced to 120 torr, held for 30 minutes and then reduced to 30 torr where it was held for an additional 30 minutes and finally to less than 2 torr for the remainder of the reaction. The air sweep was discontinued at this point. The bath temperature was then increased to 250° C. After 1 hour under these conditions the bath temperature was raised to 300° C. and held for an additional 25 minutes. After this, the metal bath was removed and the polymer cooled and granulated. The polymer has a melt viscosity of 95,960 poise at 300° C. and produced very tough pressed films. The polymer $T_g$ was measured as 106° C.

EXAMPLE 2

This example illustrates preparation of a copoly(arylene sulfide) polymer known in the art.

The preparation of Example 1 was repeated except the amount of p-diiodobenzene was 410.0 g (1.243 mol) and no diiodo fluorinated aromatic compound was used. The viscosity of the polymer was 120,600 poise at 300° C. Pressed films of this polymer were very tough. The $T_g$ of the polymer was 96° C.

EXAMPLE 3

This example illustrates the surprisingly high adhesion of the fluorinated copoly(arylene sulfide) polymer of this invention compared to the copoly(arylene sulfide) polymer of the prior art.

The lap sheer strength of both the polymer of the invention prepared in Example 1 and the polymer of the prior art prepared in Example 2 is determined in the following manner. Freshly cleaned, one inch wide tin-free steel strips of 0.005 in. thickness were selected. Pieces of pressed polymer film of one inch square area were pressed between two such strips at 300° C. for 20 sec. in a press and cooled in the air. The bonds were made in a conventional lap shear configuration and tested at a crosshead speed of 0.05 in./min. The peak value of the bond in lb./in. was reported.

The lap sheer strength of the polymer of the invention was 309 while the lap sheer strength of the polymer of the prior art was 281.

We claim:

1. A polymer having repeating units corresponding to the structure

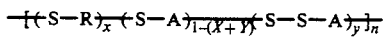

wherein R is selected from the group consisting of

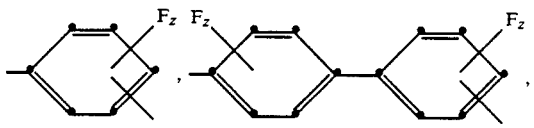

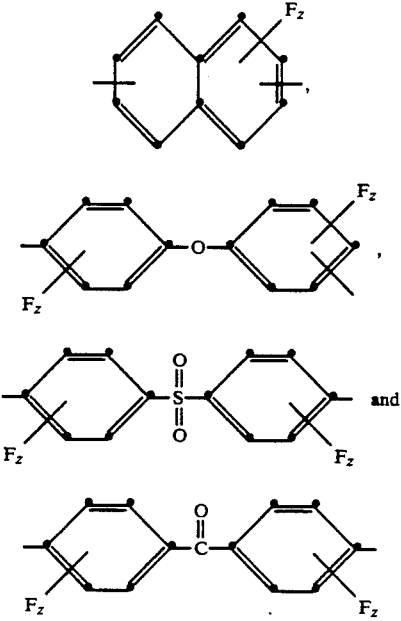

where z is 1, 2, 3, or 4, A is divalent substituted or unsubstituted aromatic radical, y is in the range of 0.10 to 0 and x is in the range of 0.02 to 0.90 and n is at least 50.

2. The polymer of claim 1 wherein n is at least 80.
3. The polymer of claim 1 wherein the aromatic radical is phenylene, biphenylene, diphenyl ether, or naphthalene.
4. The polymer of claim 1 wherein the aromatic radical is unsubstituted phenylene.
5. The polymer of claim 1 wherein z is 4.
6. The polymer of claim 1 wherein R is

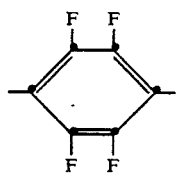

7. The polymer of claim 1 wherein x is in the range of 0.05 to 0.85.
8. The polymer of claim 1 wherein y is in the range of 0.08 to 0.001.
9. The polymer of claim 1 wherein y is in the range of 0.18 to 0.001.
10. A polymer having repeating units corresponding to the structure

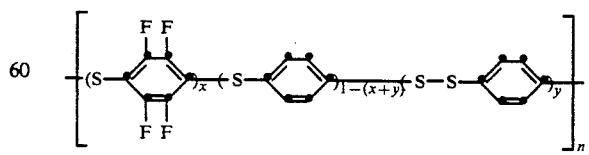

wherein y is in the range of 0.18 to 0.001 and x is in the range of 0.10 to 0.80 and n is at least 80.

* * * * *